(12) United States Patent
Ortalano et al.

(10) Patent No.: US 7,459,017 B2
(45) Date of Patent: Dec. 2, 2008

(54) STIR-IN FORM OF PIGMENT

(75) Inventors: Mark Ortalano, Cincinnati, OH (US); Darleen Wright, Hamilton, OH (US); William Burgess, Summerville, SC (US); Brian Thompson, Goose Creek, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/599,470

(22) Filed: Nov. 15, 2006

(65) Prior Publication Data

US 2008/0110368 A1    May 15, 2008

(51) Int. Cl.
*C09B 67/20* (2006.01)
*C09B 67/00* (2006.01)
*C09B 67/04* (2006.01)
*C09B 67/10* (2006.01)
*C09B 67/12* (2006.01)

(52) U.S. Cl. .............. 106/493; 106/412; 106/413; 106/496; 106/497; 106/498; 106/499

(58) Field of Classification Search ............. 106/412, 106/493, 499, 413, 496, 497, 498
See application file for complete search history.

(56) References Cited

U.S. PATENT DOCUMENTS

| | | | |
|---|---|---|---|
| 4,298,526 A * | 11/1981 | Sappok et al. | ........... 540/122 |
| 5,041,488 A | 8/1991 | Meades | |
| 5,421,875 A | 6/1995 | Chambers et al. | |
| 5,824,734 A | 10/1998 | Yang | |
| 6,379,451 B1 | 4/2002 | Kitamura et al. | |
| 6,398,861 B1 * | 6/2002 | Knox | ................... 106/404 |
| 6,488,760 B1 | 12/2002 | Binns et al. | |
| 6,582,505 B1 | 6/2003 | Bouvy et al. | |
| 6,942,723 B2 | 9/2005 | Yatake et al. | |
| 7,122,081 B2 * | 10/2006 | He et al. | ................ 106/493 |
| 2005/0080171 A1 | 4/2005 | Reisacher et al. | |
| 2005/0090609 A1 | 4/2005 | Reisacher et al. | |
| 2005/0235876 A1 | 10/2005 | Reisacher et al. | |

FOREIGN PATENT DOCUMENTS

JP    2005263972 A * 9/2005

* cited by examiner

*Primary Examiner*—Anthony J Green
(74) *Attorney, Agent, or Firm*—Dickstein Shapiro LLP

(57) ABSTRACT

Disclosed is a composition and process of manufacture of a stir-in form of pigment with increased dispersing and color properties. Pigment is slurried with acetylenic dispersing agents, wet-milled to a particular particle size, and then dried to powder or granulate form. Also disclosed is a process for producing a pigmented paint composition from the stir-in pigment.

26 Claims, No Drawings

STIR-IN FORM OF PIGMENT

FIELD OF INVENTION

The present invention relates generally to a stir-in pigment composition having improved properties. The stir-in form of pigment is particularly useful in the preparation of paint colorants, latex paints, or other pigmented products.

BACKGROUND OF THE INVENTION

Liquid systems, such as coatings, varnishes, emulsion paints and printing inks, are usually colored with paint colorant or other such pigment formulations either by In-Factory or by In-Store methods. In-Factory coloration of paint involves coloring large batches of paint in a factory with select colors. The finished paint is then shipped to shops for direct sale.

By contrast, with In-Store coloration, a consumer purchases white latex or alkyd paint, and then selects a color from a swatch to be matched. A tinter in the form of paint colorant is then metered by a dispensing system directly into the can of paint. Various colorants are metered into the paint in order to achieve the desired color match, and this process is often controlled by computer color matching software. Typically, there are twelve colorants in a dispensing system: six of which are based upon organic pigments and six of which are based upon inorganic pigments. Dosing levels may vary from 1 ounce to 12 ounces per gallon (7-90 g/l) of paint to achieve proper color strength. Once the colorant is dispensed into the can of paint, a paint shaker is used to insure homogeneity.

Paint colorant ordinarily contains pigment, water, inorganic extender, humectants, surfactants and other additives, such as biocides and defoamers. The organic pigment palette can vary, but generally contains phthalocyanine blue (ranging from green shade to red shade), phthalocyanine green, quinacridone magenta, carbazole violet, quinacridone violet, naphthol red and monoarylide yellow. The pigment concentration varies, but the range will typically be from about 5% (for deep colors, such as violet, blue and quinacridone) to up to about 40% (for light colors, such as yellow).

Organic pigments are initially formed in a presscake phase, where the pigment percentage can vary from 20% to over 50% solids with the remainder being water. Presscake can then be dried to 100% powder by various techniques. The techniques can include, but are not limited to, spray drying, spin-flash drying and tray drying. Aggregation or agglomeration occurs with both formation of presscake or dry color; however, it generally occurs to a greater degree with dry color. Therefore, for pigment to be of commercial value in the coloration of paints, inks, plastics and other areas, the pigment dry color or presscake must be dispersed into a suitable medium (water, solvent, oil, wax, plastics, etc.) by use of dispersants and by various milling techniques. Dry color provides larger formulating latitude due to being 100% color; while presscake is more limiting due to the relatively low solids; however, dry color is more difficult to disperse due to high levels of aggregation.

Colorants generally contain inorganic extender in order to build solids, density and viscosity necessary for efficient dispensing. Talc, clay or other suitable extenders are typically used from levels ranging from about 7% up to about 40%. The pigment and extender are dispersed into water with surfactant, and combinations of surfactants may be used for this purpose. Also, surfactants of medium-to-high HLB are preferred for pigment dispersing. Low HLB surfactants or hydrophobic surfactants are also utilized to impart alkyd compatibility to the colorant, since alkyd paints are also colored.

Humectants, such as ethylene glycol, propylene glycol and others are used for a variety of reasons in the colorant. Levels of humectant may range from about 5% to 40% depending upon the system. Humectants provide additional compatibility with the paints, as well as freeze/thaw resistance and reduced flaking once the colorant dries in the can. These are also used as leveling and flow agents in paints. Examples of colorant compositions are described in U.S. Pat. No. 6,488,760. In U.S. Pat. No. 6,582,505 aqueous pigment dispersions are described for the coloration of paints. These contain branched alcohol alkoxylates as pigment dispersants.

There is a need for stir-in pigment powders that have dispersability and color properties similar to liquid paint colorants, but do not require all the additives of current formulations mentioned above and that are easy to store and transport.

Stir-in forms of dry color have been developed. US 2005/0080171 describes a form of stir-in colorant containing 60%-90% by weight of at least one pigment; 10%-40% by weight of at least one nonionic surface-active additive based on polyethers; and 0.1%-10% by weight of at least one anionic surface-active additive based on sulfonates, sulfates, phosphonates or phosphates. These preparations can then be used to pigment macromolecular organic and inorganic materials, such as in the In-Store coloration method. DE 10204304 A1, DE 10227657 A1 and WO 03066743 A1 contain similar compositions with the following surface-active types: nonionic surfactant based on polyethers, anionic surface-active additive based on sulfonates, sulfates, phosphonates or phosphates. U.S. Pat. No. 6,379,451 describes a pigment composition prepared with a pigment in the presence of a nonionic surfactant composed of acetylenic linkage. These pigment compositions are prepared through dry-milling.

SUMMARY OF THE INVENTION

This invention relates to the composition and process of manufacture of a stir-in form of pigment. Pigment is mixed with acetylenic dispersing agents, wet-milled to a particular particle size, and then spray dried to powder or granulate form. This form of color can then be stirred into various systems of color latex paints, paint colorants, coatings, inks and the like. Furthermore, this invention pertains to the process of manufacture of a paint from the stir-in form of pigment. The stir-in form of pigment of the present invention is easy to disperse in pigment systems due to low levels of solids aggregation. Additionally, the present invention has good color properties.

Acetylenic-based surface-active agents are commonly used in water-borne paints & coatings, inks, textiles and in other applications. A stir-in form of pigment containing an acetylenic would provide greater latitude of compatibility with systems containing these types of surfactants. These and other aspects will become apparent upon reading the following detailed description.

DETAILED DESCRIPTION OF THE INVENTION

The present invention is a stir-in pigment suitable for use in various pigment systems. The synergistic effect of acetylenic surfactants slurried with pigment results in a stir-in pigment with increased dispersability and color properties in a pigment system. Importantly, the stir-in pigment has distinct handling advantages since it is easy to store and transport.

A composition according to the present invention contains:
(a) organic pigment;
(b) an acetylenic surfactant; and
(c) milling liquid.

The crude organic pigments can be manufactured by any process. As known, there are a variety of techniques depending upon the type of pigment. For example, azo pigments are generally made in a strike tank with non-colored and water soluble intermediates. After the reaction is complete, the intermediate molecules react to form larger, water-insoluble and vividly colored molecules. Due to water insolubility, these molecules then form crystals. Purification follows and the solids content adjusted to form presscake or dry color.

Phthalocyanine blue is synthesized by use of urea, phthalic anhydride, cuprous catalyst and solvent. Solvent is removed to make crude blue. Salt attrition may follow, thereby forming a presscake. Quinacridone magenta is synthesized by condensation of dimethyl succinyl succinate with anilines followed by ring closure, conditioning, and finally by formation of presscake.

Among the organic pigments which can be used in the present invention are PB-15:0, 15:1, 15:2, 15:3 or 15:4, PR-122, PR-202, PV-19, PV-23, PY-74, PY-73, PG-7, PR-188, PR-112 or any other organic pigment found in the Color Index International.

In the present invention, the pigment and milling liquid are slurried with one or more acetylenic-based surface-active agents. The liquid in which the pigment was formed can be the milling liquid. Other milling liquids include the glycol ethers such as, for instance, dipropylene glycol n-butyl ether and the like. In one embodiment, the milling liquid is or contains water. The pigment will generally be about 5 to about 50% of the pigment/liquid combination, preferably about 10 to about 40%, most preferably about 20 to about 30%, and the combination will form a slurry.

In one embodiment, 2,4,7,9-tetramethyl-5-decyne-4,7-diol, commercially available as Disperse AYD W-30, is the acetylenic surfactant. However, any known acetylenic surfactant can be employed by the present invention. Non-limiting examples of the surfactant include: 2,4,7,9-tetramethyl-5-decyne-4,7-diol, 3,6-dimethyl-4-octyne-3,6-diol, 2,5-dimethyl-3-hexyne-2,5-diol, or ethylene oxide adducts thereof. Other suitable acetylenic diol surfactants include those of the general formulas I and II:

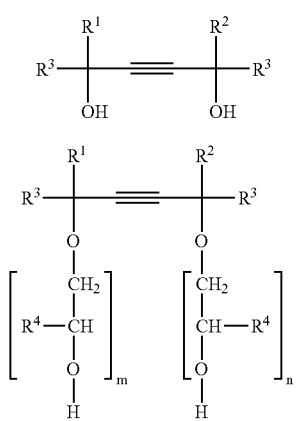

where $R^1$ and $R^2$, which may be the same or different, are $C_1$-$C_8$ alkyl, $R^3$ is hydrogen or methyl, $R^4$ is hydrogen, methyl, ethyl, or any combination thereof, and m+n have an average value from 1 to 100. Since alkoxylation of the acetylenic alcohol affords a distribution of alkoxy groups, m+n typically is reported as an average value. Acetylenic diol II is the alkoxylated product of diol I. Among the acetylenic surfactants that can be used are 3,6,8-trimethyl-4-nonyne-3,6-diol; 3,5-dimethyl-1-hexyne-3-ol; and 2,5,8,11,-tetramethyl-6-dodecyne-5,8-diol.

The presscake is then wet-milled to a fine particle size (≦300 nanometers, preferably ≦150 to 200 nm) followed by drying to a granulate. Milling techniques include media milling and media in the range of about 0.25 mm to 2 mm can be utilized. Types of media include, but are not limited to, YTZ, SEPR, glass or steel. The slurry can then be dried to granulate powder by various techniques. The techniques can include, but are not limited to, spray drying, spin-flash drying and tray drying.

The resultant granulate can have about 60% to about 95%, preferably about 70 to about 85%, pigment and about 5% to about 40%, preferably about 15 to about 30%, of acetylenic dispersant based on the weight of the pigment/acetylentic dispersant. If desired, other dispersants, e.g., sulfonated dispersants such as Aerosol OT, can also be employed during the wet milling or drying step. When employed, such other dispersants will generally constitute about 0.1% to 10% based on the weight of the total composition.

The granulate can be used to pigment paint colorant by mixing [may be opaque] a colorant extender with the granulate by mixing under mild agitation. The agitation time depends upon the energy of the mixer, but typically about 5 minutes to 30 minutes under a propeller mixer is sufficient to provide complete pigmentation.

The balance of the paint colorant to which stir-in pigment is added is conventional. The colorant extender can contain water, glycols, surfactants, lecithin (or other alkyd compatibilizers). Other additives include, but are not limited to, biocides, defoamers and flow & leveling aids.

In the colorant, the extender can be synthetic or natural extenders from the following classes: talc, clay, mica, calcium carbonate, silica, silicates and sulfates; or mixtures of above.

Glycols include but are limited to ethylene glycol, propylene glycol, diethylene glycol, polyethylene glycols, glycerin, glycerol, sorbitol and other typical glycols.

The surfactants can be natural or synthetic, and can be of the following classes: anionic, nonionic, cationic or amphoteric, or a mixture thereof. Anionic surfactants can be phosphate esters, carboxylic acids, sulfonates and sulfates, but is not limited to these only. Nonionic surfactants can be acetylenics, alkyl phenol ethoxylates/propoxylates, EO/PO block copolymers, linear or branched alcohol ethoxylates, esters, but is not limited to these only. Cationic surfactants can be primary, secondary, tertiary and quaternary amines, imides, but is not limited to these only. Natural surfactants include lecithin, fatty acids, glucamides, glycerides, polysaccharides, but is not limited to these only. Other surfactants as found in the McCutcheon's Directory can also be present.

Humectants include, but are not limited to, propylene glycol, ethylene glycol, sorbitol and glycerin.

In order to further illustrate the invention, examples are set forth below, but the particular materials and amounts thereof recited in these examples, as well as other conditions and details, are not intended to limit this invention. For example, quinacridone magenta (C.I. Pigment Red 122 or 202) was chosen for illustrative purposes because of its common usage in architectural paints & coatings, but other pigments could have been used. All parts and percentages are by weight and all temperatures in degrees Centigrade unless otherwise noted.

EXAMPLE 1

A stir-in pigment powder composition in accordance with the present invention was made as follows. 85% of C.I. Pigment Red 122 (228-0122 from Sun Chemical) presscake (on dry basis) was mixed with 15% 2,4,7,9-tetramethyl-5-decyne-4,7-diol (Disperse AYD) (dry basis). The slurry was then wet milled on a Netzsch mill for a duration of 1 hour to a particle size of 193 nm. The media used was 0.8 to 1.0 mm white zirconium oxide. This material was subsequently spray-dried.

EXAMPLE 2

Example 1 was repeated except that the wet milling time was 2 hours and the resulting particle size was 180 nm.

EXAMPLE 3

Example 1 was repeated except that the wet milling time was 3 hours and the resulting particle size was 167 nm.

EXAMPLE 4

Example 1 was repeated except that 80% of C.I. Pigment Red 122 (228-0122 from Sun Chemical) presscake (on dry basis) was mixed with 20% Disperse AYD (dry basis) and wet milled for 1 hour with a resulting particle size of 210 nm.

EXAMPLE 5

Example 4 was repeated, except that the wet milling time was 2 hours and the resulting particle size was 196 nm.

EXAMPLE 6

Example 4 was repeated, except that the wet milling time was 3 hours and the resulting particle size was 179 nm.

EXAMPLE 7

Example 1 was repeated except that 88% of C.I. Pigment Red 122 (228-0122 from Sun Chemical) presscake (on dry basis) was mixed with 12% Disperse AYD (dry basis) and wet milled for 20 minutes with a resulting particle size of 188 nm.

EXAMPLE 8

Example 7 was repeated, except that the wet milling time was 3 hours and the resulting particle size was 168 nm.

EXAMPLE 9

Example 1 was repeated except that 87.3% of C.I. Pigment Red 122 (228-0122 from Sun Chemical) presscake (on dry basis) was mixed with 12.7% Disperse AYD (dry basis) and wet milled for 1.5 hours with a resulting particle size of 251 nm.

EXAMPLE 10

A pigment paint composition in accordance with the present invention was made as follows. 11% of the stir-in pigment powder composition from Example 8 was added to a combination of the following ingredients: ethylene glycol, propylene glycol, lecithin, talc, water and ethoxylated nonionic surfactant. The stir-in pigment powder composition was stirred for 15 minutes with a simple paddle stirrer at 3000 rpm. A control pigment composition was prepared by directly milling untreated 228-0122 dry pigment into the same mixture of ethylene glycol, propylene glycol, lecithin, talc, water and ethoxylated nonionic surfactant. The resulting paint compositions were then tinted into a white base paint and drawn down onto Leneta cards for evaluation. Once dried, the example drawdown was compared with the control drawdown by using a Data Color Spectraflash SF 450 Spectrophotometer. The color strength of the example was 96.1% of the strength of the control sample.

EXAMPLE 11

A pigment paint composition in accordance with the present invention was made as follows. 11% of the stir-in pigment powder composition from EXAMPLE 9 was added to a combination of the following ingredients: ethylene glycol, propylene glycol, lecithin, talc, water and ethoxylated nonionic surfactant.

The stir-in pigment powder composition was stirred for 15 minutes with a simple paddle stirrer at 3000 rpm. A control pigment paint composition was prepared by directly milling untreated 228-0122 dry pigment into the same mixture of ethylene glycol, propylene glycol, lecithin, talc, water and ethoxylated nonionic surfactant via an Eiger Mini-Mill. The resulting paint compositions were then tinted into a white base paint and drawn down onto Leneta cards for evaluation. Once dried, the example drawdown was compared with the control drawdown by using a Data Color Spectraflash SF 450 Spectrophotometer. The color strength of the example was 101.05% of strength of the control sample.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims.

What is claimed is:

1. A pigment powder composition comprising a wet milled combination of organic pigment, water, and acetylenic surfactant, which has been dried to a powder and wherein the surfactant is about 5 to 40% of the powder.

2. The pigment powder composition of claim 1, wherein the pigment is about 60% to 95% of the powder.

3. The pigment powder composition of claim 2, wherein the surfactant is about 5 to 40% of the powder.

4. The pigment powder composition of claim 1, wherein the pigment is selected from the group consisting of Pigment Blue 15:0, 15:1, 15:2, 15:3, 15:4, Pigment Green 7, Pigment Red 112, Pigment Red 122, Pigment Red 202, Pigment Violet 19, Pigment Violet 23, Pigment Red 188, Pigment Yellow 74, and Pigment Yellow 73.

5. The pigment powder composition of claim 4, wherein the pigment is a Pigment Red.

6. The pigment powder composition of claim 4, wherein the pigment is Pigment Red 122.

7. The pigment powder composition of claim 4, wherein the pigment is a Pigment Blue.

8. A paint composition comprising a pigment powder composition and a paint base, wherein the pigment powder composition comprises a wet milled combination of pigment, water, and acetylenic surfactant, which has been dried to a powder.

9. The paint composition of claim 8, wherein the paint base comprises at least one of water, an extender, a humectant, and a second surfactant, wherein the second surfactant is selected from the group consisting of anionic, nonionic, cationic, amphoteric surfactants, and mixtures thereof.

10. The paint composition of claim 9, wherein the anionic surfactant is selected from the group consisting of phosphate esters, carboxylic acids, sulfonates, sulfates mixture thereof.

11. The paint composition of claim 9, wherein the nonionic surfactant is selected from the group consisting of acetylenic surfactant, alkyl phenol ethoxylates/propoxylates, EO/PO block copolymers, alcohol ethoxylates, esters, or mixture thereof.

12. The paint composition of claim 9, wherein the cationic surfactant is selected from the group consisting of primary, secondary, tertiary and quaternary amines, imides, or mixture thereof.

13. The paint composition of claim 9, wherein the surfactant second is a natural surfactant selected from the group consisting of lecithin, fatty acids, glucamides, glycerides, polysaccharides, or mixture thereof.

14. The paint composition of claim 9, wherein the selected surfactant is about 5 to 25% of the composition.

15. The paint composition of claim 9, wherein the extender is selected from the group consisting of talc, clay, mica, calcium carbonate, silica, silicates and sulfates, and mixtures thereof.

16. The composition of claim 9, wherein the extender is 7 to 40% of the composition.

17. The paint composition of claim 9, wherein the humectant is selected from the group consisting of propylene glycol, ethylene glycol, sorbitol, glycerin, and mixtures thereof.

18. The paint composition of claim 9, wherein the humectant is 7 to 30% of the composition.

19. The paint composition of claim 8, further comprising at least one member selected from the group consisting of biocide, defoamer, flow aid, and leveling aid.

20. A method of forming a pigment powder comprising:
providing a mixture of pigment, milling liquid, and acetylenic surfactant,
wet milling the mixture, and
drying the milled mixture.

21. The method of claim 20, wherein the pigment is about 60% to 95% of the mixture.

22. The method of claim 20, wherein the acetylenic surfactant is about 5% to 40% of the mixture.

23. The method of claim 20, wherein the milling is media milling.

24. The method of claim 23, wherein the drying is spray drying.

25. The method of claim 20, wherein the drying is spray drying.

26. An article comprising a substrate having the paint composition of claim 8 thereon.

* * * * *